Figure 1:
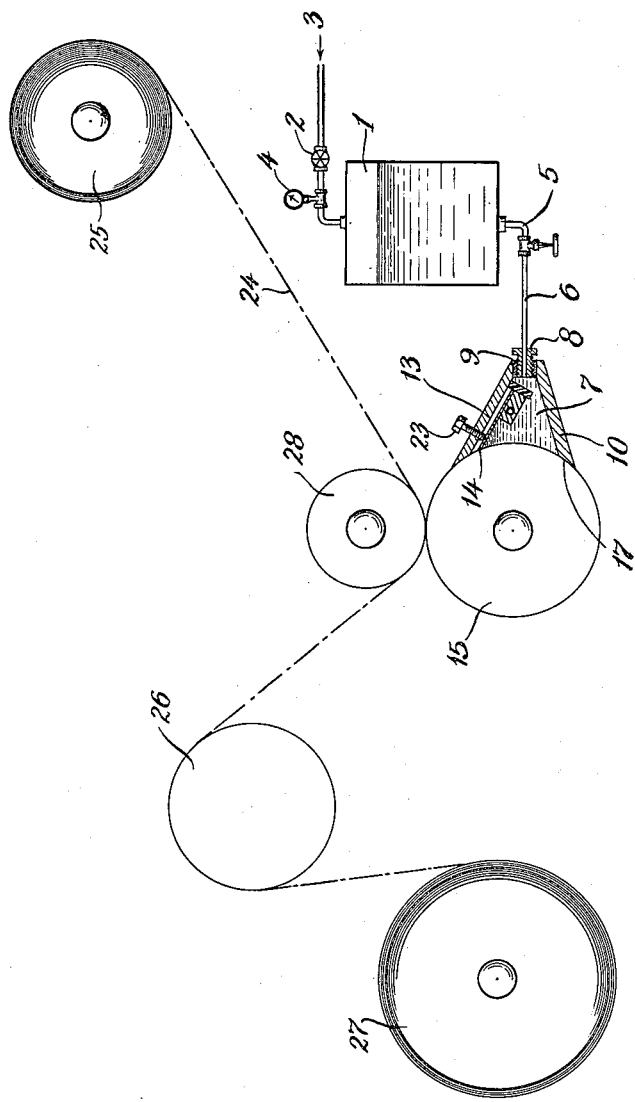

INVENTORS·
CHARLES A. KUMINS
JEROME FINE
VERNON L. CHASE

BY

DWIGHT J. POTTER ATTORNEY

2,971,458
PROCESS OF COLORING TEXTILE MATERIALS

Charles A. Kumins, Chappaqua, and Jerome Fine, Oceanside, N.Y., and Vernon L. Chase, Oakland, N.J., assignors to Interchemical Corporation, New York, N.Y., a corporation of Ohio Filed Dec. 30, 1957, Ser. No. 705,867

3 Claims. (Cl. 101—170)

This invention relates to a novel process of applying colors to textile materials, and especially to a novel process of applying color in a preselected pattern to fabrics.

The terms textile material and fabric are used interchangeably herein and are intended to include within their scope threads, yarns, woven and knitted goods, resin bonded mats of fibers, and sheet materials generally, whether of rubber, paper, glass fibers, metal or plastic.

In recent years, the art of printing colors in preselected patterns on fabrics by means of engraved printing rollers has become highly developed and come into widespread use. For successful textile printing it has been necessary to thicken the coloring medium by use of thickeners, such as gum tragacanth (which is often used for dye-printing) or by using a water-in-oil or oil-in-water emulsion as the vehicle (the systems most used in printing with pigments). For example, in pigment printing, it is customary to prepare a lacquer comprising a water-immiscible volatile hydrocarbon solution of a binder resin and an emulsifier having dispersed therein a suitable pigment, and to emulsify enough water or water containing an elastomer latex into this lacquer to give an emulsion of suitable consistency or body to permit printing from engraved printing rollers. Also, it has been proposed to print onto textiles with an oil-in-water emulsion prepared by emulsifying a pigmented lacquer into water or water containing an elastomer latex. All of these printing systems are characterized by use of substantial quantities of relatively expensive ingredients which have the sole, or at least chief, purpose of thickening the printing paste to a consistency thick enough to allow it to be printed from engraved rolls. An advantage of the water-in-oil printing systems has been the fact that water was often the chief ingredient of the printing paste, which tended thus to reduce the cost of the pastes, but the water-in-oil systems have been found to have disadvantages in that objectionable fumes are given off and the equipment is difficult to clean. Oil-in-water systems are easier to wash from printing equipment, but generally give weaker prints than do water-in-oil systems, and generally require use of a higher proportion of volatile, water-immiscible solvent. Both the oil-in-water and the water-in-oil printing systems require that large amounts of water and non-aqueous solvents be evaporated promptly from the goods after printing, and this entails the need of supplying a great deal of heat for evaporating both water and solvent, tends to create health, fire, and explosion hazards due to the presence of high concentrations of solvent vapors in the immediate locality of the printing machine, and generally involves the discharge of the solvent vapors into the atmosphere, which is objectionable both because of the cost of the solvents thus dissipated and because of their pollution of the atmosphere.

We have now found, surprisingly, that excellent prints can be made using a printing paste which is thickened largely by air or other permanent gases, such as nitrogen, oxygen, carbon dioxide, argon, etc.

For purposes of simplicity of expression, the term "air" as used hereinafter in this specification and the annexed claims is intended to include its obvious functional equivalents including flue gas, carbon dioxide, nitrogen, oxygen, internal combustion engine exhaust gases, fluorinated hydrocarbons of the types known as Freons and Genetrons and widely used as aerosol propellants, etc. For obvious reasons, we ordinarily prefer to avoid use of toxic, corrosive, inflammable, or suffocating gases, and accordingly prefer to use air, oxygen, or mixtures of these.

We have found that satisfactory printing pastes can be made containing as little as about 10% air (by volume) or as much as about 90% air (also by volume). A more convenient scale for designating the air content of our printing foams is density, i.e. grams per cubic centimeter, and in what follows, we will usually specify our foams in these terms. Satisfactory prints have been made employing foams of densities as low as 0.10 and as high as 0.9, but in most cases we prefer a density between 0.30 and 0.75, with a density of about 0.50 preferred. It will be readily appreciated, of course, that the preferred density in a given case will depend somewhat on the identity and intensity of the color to be applied, on the quantity and nature of the auxiliary chemicals contained in the mix, such as binders, emulsifiers, thickeners, foam stabilizers, etc. Foam printing pastes of high pigment content will generally need to be more dense (i.e., contain less air) than those of relatively lower pigment content. In other words, there must be a certain minimum amount of liquid sufficient to dissolve and/or disperse the solids which need to be contained in the printing composition. For a low-solids foam paste, the liquid can usually be less than for a high-solids foam paste.

We have found that any given air-free foam-base composition can be foamed to give foams with a wide range of densities, but that the stability of the foams will be at a maximum in an intermediate portion of such density range. In order to achieve consistent and uniform results in printing, it is desirable to use foams whose density is in the region of good stability.

The size of the individual air bubbles in our printing foams can and does vary somewhat. It is important, however, to have the bubbles as nearly uniform in size as possible. Where the print paste is to be printed from an intaglio cylinder or plate it is important to have the bubbles considerably smaller than the finest lines in the engravings, so as to assure sharpness of the print.

Although we have employed the novel foamed inks of this invention chiefly for the printing of decorative designs on fabrics from engraved printing cylinders, the same inks have other uses. They may be employed for gravure printing on paper or wood, and may be employed in silk-screen printing also.

Coloring of textiles with our novel foams may be performed in many different ways. It is possible to produce colored textiles by conventional padding methods; i.e., the goods are passed continuously through a body of foam, squeezed between rollers, and then passed over a steam-can or through any suitable type of dryer.

In some cases it has been found possible to attain good printing results by maintaining a supply of foam in a furnishing box, transferring foam from the furnishing box to an engraved printing cylinder by means of an intermediate cylindrical fiber brush, scraping excess foam from the printing cylinder with a conventional doctor blade, and returning such excess foam to the furnishing box. In systems such as this, however, there is a tendency for the air content of the foam to increase with running due to the repeated transfers; this has, surprisingly, been overcome to some extent by providing the furnishing box with high speed beaters which help keep the air content of the foam nearly constant.

However, the preferred means of supplying our novel foamed printing pastes to engraved printing rollers is a specially designed print paste feeding means, an embodiment of which is illustrated by the accompanying drawing. This paste feeding device is specially designed to prevent additional air from contracting the print paste in the vicinity of its contact with the cylinder.

Figure 2:
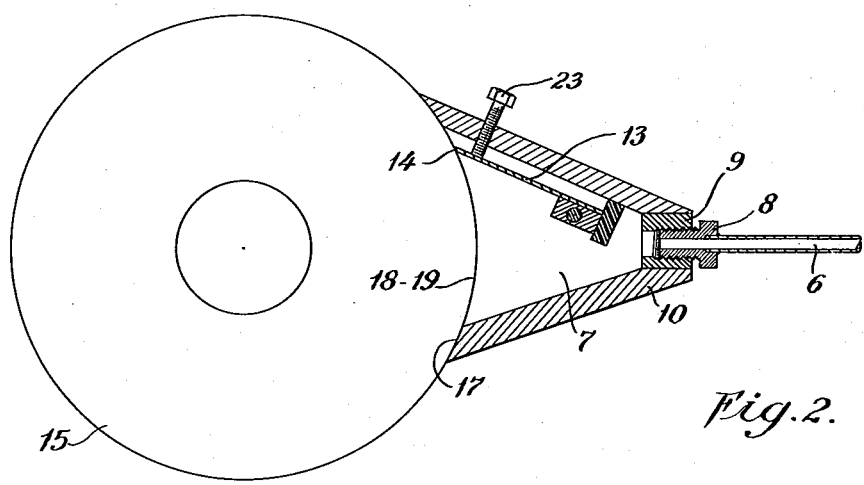
Figure 3:
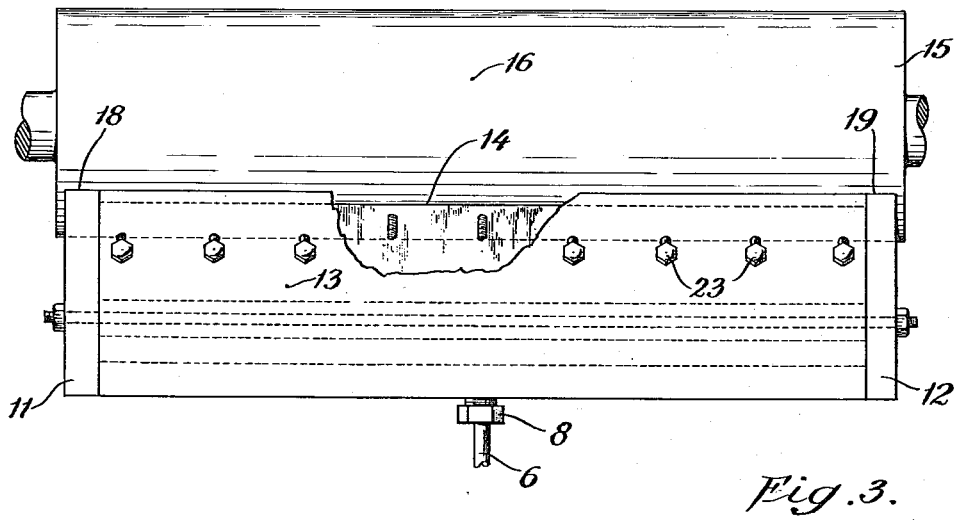

Figure 1 is a simplified schematic representation of a textile printing machine arranged for the practice of our invention. Figure 2 is an end-view representation of an engraved printing cylinder and one form of print paste distributing box suitable for the practice of our invention. Figure 3 is a top-view of the equipment represented in Figure 2.

Since the art of printing designs on fabrics is old and well understood, the details of conventional machinery used in our invention are not shown in the drawings; the details of printing machine frame, bearings, gears, speed controls, doctor-blade assembly, web-tensioning means, etc., are familiar to those well-versed in this art and need not be set forth here. Those familiar with the printing arts will readily understand that conventional equipment can be used with slight modifications in the practice of our invention, that such modifications are sufficiently set forth in this specification, and that the accompanying drawings represent one type of equipment suitable for the practice of our invention.

In Figure 1 there is represented a web, 24, of goods to be printed, said web being caused, in the process of printing to unroll from web-supply roll 25 and to pass between impression roller 28 and printing cylinder 15, to pass over a steam-can 26, and then to collect on web-receiving roll 27. An ink or print paste reservoir 1 having a pressure gage 4 is connected by valved line 5 to a wholly-enclosed conduit 6 which communicates with the ink-distributor box 7 through a supply-port 8. Box 7 consists of a back 9, bottom 10, top 13, ends 11 and 12. Top 13 is a doctor blade with edge 14 adapted to fit snugly against an engraved printing cylinder 15 having any desired pattern engraved on its central portion 16. Base 10 and ends 11 and 12 are provided with cylindrically concave surfaces 17, 18, and 19 adapted to fit snugly against the engraved printing cylinder 15 with the ends 11 and 12 preferably enclosing portion 16 of cylinder 15. Resilient sealing means are employed to seal the spaces between top 13, and back 9 and ends 11 and 12. Doctor blade adjusting means 23 are provided to permit adjusting the doctor blade to uniform scraping contact with the engraved printing cylinder. If desired, suitable means (not shown in the drawing) may be provided to oscillate either the whole box assembly from side to side or to oscillate the doctor blade in the rigidly mounted box. Such oscillation is frequently employed in the printing arts to avoid scoring of the engraved printing cylinder.

Turning again to the drawings, the textile material to be printed, 24, is unrolled from a stock roll 25 and passes between printing cylinder 15 and impression cylinder 28 and then over a steam can 26, after which it may pass through any suitable curing zone (not shown) to receiving roll 27. Air at a low pressure is supplied through line 3 to cause the viscous ink to flow from the ink reservoir 1 into the ink distributing box 7 at a rate adjusted to just equal the rate at which it is transferred to the goods. In some cases it is satisfactory to mount the ink reservoir 1 at a level somewhat above box 7 and to rely on hydrostatic pressure instead of a regulated air pressure to maintain the ink flow at the desired and necessary rate.

It is believed that the mode of employment of the equipment just described will be self-evident to those well-versed in the textile printing art. While this ink supply system can be used for almost any textile printing paste, including water-in-oil emulsions, oil-in-water emulsions, pastes thickened with gum tragacanth, gum arabic, alginic acid, etc., it is especially valuable in connection with the air-thickened pastes used in the process of this invention.

Surprisingly, we have found that, in most cases in which we have made a comparison, cloth printed with the novel air-thickened pigment printing pastes of the present invention shows better color yield than the same cloth printed with conventional oil-in-water or water-in-oil type pigment printing pastes to give the same deposition of pigment on the cloth. We have been unable to determine the mechanism of this improved performance or to formulate any theory which accounts for it satisfactorily, but the fact that such improved utilization of pigments is obtained by use of our novel air-thickened pastes is one of the important advantages of their use.

The foamed inks of the present invention will in general, contain a color material, air, water, a thickening agent, an emulsifier, and a foam stabilizer.

The color material may be dissolved or dispersed in the liquid phase, and may be a dye, a pigment, dyestuff intermediates which are converted to color after application, or a mixture of two or more of these. Suitable pigments include all the well-known types of textile printing pigments, including metallic pigments, inorganic pigments and organic pigments.

Among suitable thickening agents are gum arabic, gum tragacanth, methyl cellulose, hydroxyethyl cellulose, polyvinyl alcohol, alginic acid and its salts, polyacrylates, starch, and polymeric polycarboxylic acids and salts thereof. Our preferred thickener is the ammonium salt of a product known as Goodrite Carbopol K-934, sold by B. F. Goodrich Chemical Co. and reported to be a copolymer of 100 parts acrylic acid with 1 to 2 parts of allyl sucrose.

Suitable emulsifiers include ammonium and potassium salts of $C_{12}$–$C_{18}$ saturated and unsaturated aliphatic monocarboxylic acids, alkali and ammonium salts of sulfated $C_{10}$–$C_{20}$ fatty alcohols and monoglycerides, sulfonated $C_{10}$–$C_{24}$ paraffin hydrocarbons, sulfonated long-chain alkyl aromatic hydrocarbons, sulfated water-insoluble oxyethylated higher alkyl phenols, water-soluble oxyalkylated higher alkylphenols, and the like. Also suitable, though in general less preferred, are the cationic surface active agents typified by cetyl pyridinium chloride, lauryl trimethyl ammonium bromide, tetradecyl morpholinium bromide, and long-chain alkyl amine oxides. Other emulsifiers usable in compounding suitable foamable bases for use in this invention include the alkali, ammonium, and amine salts of higher alkenyl succinic acids, di-higher alkyl sulfosuccinates, and the various condensation products, well-known in the art but of complex structures, prepared by interaction of fatty acids or esters with primary or secondary alkanolamines.

Suitable foam stabilizers include the higher fatty alcohols such as decyl alcohol, lauryl alcohol, tetradecyl alcohol, cetyl alcohol, oleyl alcohol and stearyl alcohol, the higher alkyl mono-ethers of ethylene glycol, diethylene glycol, propylene glycol, and dipropylene glycol (such as cetyl diethylene glycol ether), fatty monoglycerides such as glycerol monolaurate and glycerol monostearate, amides such as stearic acid amide and stearic acid ethanolamide, N-higher alkyl hydroxyalkyl carbamates such as N-dodecylhydroxyethyl carbamate, and the like.

Air may be incorporated into the air-free foamable inks by any of a number of well-known means. Air may be beaten in by vigorously agitating the base in an open vessel, or it may be introduced in the form of fine bubbles through orifices below the surface of the base. Or a combination of methods may be used.

In pigment printing with air-thickened pigment systems, we also prefer to employ a binder resin, such as a melamine-formaldehyde resin or an alkyd resin, and such an amount of elastomer latex, such as a latex of a butadiene-acrylonitrile copolymer, as will confer the desired degree of crock resistance on the printed goods. The use of such latices in pigment printing is well known in the art, and very much the same considerations enter into their use in our air-thickened pastes as are relevant to their use in oil-in-water emulsions or in water-in-oil emulsions. Thus, when printing with high-pigment content pastes it is desirable to have relatively more latex present than is needed in the use of low pigment pastes.

Many textile pigments are available as color concentrate pastes containing, besides the color, a binder resin, one or more thickeners, emulsifiers, and solvents. Our foamed textile printing inks can be prepared conveniently by mixing such a commercially available concentrate pigment paste with several times its volume of an unpigmented foam base and beating air into the resulting mixture until the desired air content is attained. One such foam base which has given excellent results in the preparation of foamed inks has the following composition.

*Example I*

| | Parts |
|---|---|
| Carbopol K–934 solution, 5% solids | 10.5 |
| Hycar 1561, 40% solids | 10.5 |
| Keltex solution, 2% solids | 10.5 |
| Duponol ME solution, 25% solids | 4.2 |
| Ammonium hydroxide, 28–29% | 0.47 |
| Dodecyl alcohol | 0.95 |
| Water to make 100 parts. | |

In the above formula, Carbopol K–934 is a commercial product of the B. F. Goodrich Company, Akron, Ohio, and is, as previously stated, a copolymer of allyl sucrose and acrylic acid. Hycar 1561 is an elastomer latex made by the B. F. Goodrich Company and is a copolymer of about 55% butadiene and about 45% of acrylonitrile. Keltex is a sodium alginate product marketed by the Kelco Company, and Duponol ME is a commercial sodium lauryl sulfate.

Other foam bases are represented by the following Examples II, III, and IV.

*Example II*

A foam base suitable for dye foams has the following composition:

| | Parts |
|---|---|
| Goodrite Carbopol K–934 | 0.8 |
| Sodium hydroxide | 0.4 |
| Keltex | 0.16 |
| Duponol ME | 0.4 |
| Dodecyl alcohol | 2.8 |
| Water | 25.44 |
| | 30.00 |

*Example III*

A foam base suitable for preparing direct dye printing foams has the following composition:

| | Parts |
|---|---|
| Diethylene glycol | 0.91 |
| Urea | 4.55 |
| Keltex | 0.56 |
| Duponol ME | 0.34 |
| Dodecyl alcohol | 0.82 |
| Water | 39.91 |
| | 47.09 |

*Example IV*

A foam base was prepared having the following composition:

| | Parts |
|---|---|
| Carbopol K–934 | 0.56 |
| Ammonium hydroxide (28%) | 0.50 |
| Keltex | 0.45 |
| Diethylene glycol | 6.76 |
| Urea | 11.22 |
| Duponol ME | 0.57 |
| Dodecyl alcohol | 0.90 |
| Water | 79.04 |
| | 100.00 |

*Example V*

A foamed ink was prepared by mixing a commercial Phthalocyanine Blue Color concentrate with the above-described foam base of Example I. The color concentrate had the following composition by weight:

| | Percent |
|---|---|
| Cu Phthalocyanine Blue | 15.37 |
| Turpentine | 4.60 |
| Ammonium hydroxide, 28% | 1.87 |
| Butylated melamine-formaldehyde resin | 6.96 |
| Ammonium oleate | 2.09 |
| Dipentene | 3.83 |
| Duponol ME | 3.50 |
| Methocel, 15 cps. grade | 1.25 |
| Water | 55.05 |
| Carbopol K–934 | 0.47 |
| Ethylene glycol | 5.01 |
| | 100.00 |

9.17 parts of the above color concentrate were mixed with 43.8 parts of the foam base of Example I and stirred with a high speed stirrer until the foam had a density of 0.53 gram per cubic centimeter and contained approximately 14 milligrams of pigment per cubic centimeter of paste.

*Example VI*

A long cut printing foam was prepared by mixing 2.16 parts of the color concentrate of Example V with 51.80 parts of the foam base of Example I and stirring with a high-speed stirrer until the resulting foam had a density of 0.54 and contained approximately 3.3 milligrams of copper phthalocyanine blue pigment per cubic centimeter of paste.

*Example VII*

A short cut printing foam was prepared from a commercial violet pigment concentrate and the foam base of Example I. The violet pigment was the product known to the trade as Harmon Indomaroon, Color Index: No. 1212.

This pigment concentrate had the following composition:

| | Percent |
|---|---|
| Pigment | 10.78 |
| Turpentine | 2.87 |
| Ammonium hydroxide 28% | 3.16 |
| Melamine formaldehyde resin | 4.32 |
| Ammonium oleate | 1.31 |
| Dipentene | 2.41 |
| Duponol ME | 3.29 |
| Methocel 4000 cps | 0.19 |
| Water | 65.49 |
| Carbopol K–934 | 0.43 |
| Ethylene glycol | 4.99 |
| Methocel 15 cps | 0.76 |
| | 100.00 |

9.17 parts of the above pigment concentrate was mixed with 43.8 parts of the foam base of Example I and beaten with a high-speed stirrer until the resulting foam had a density of 0.53.

Example VIII

A long cut printing foam was prepared by mixing 2.12 parts of the violet pigment concentrate of Example VII with 50.9 parts of the foam base of Example I and stirring with a high speed stirrer until the resulting foam had a density of 0.53.

Example IX

A textile printing foam was prepared from a commercial Benzidine Yellow pigment concentrate. The pigment concentrate had the following composition:

| | Percent |
|---|---|
| Pigment | 12.69 |
| Duponol ME | 3.79 |
| Methyl cellulose 15 cps | 0.90 |
| Ammonium oleate | 1.51 |
| Carbopol K-934 | 0.34 |
| Ammonium polyacrylate | 0.60 |
| Melamine formaldehyde resin | 5.00 |
| Ethylene glycol | 4.85 |
| Turpentine | 3.35 |
| Dipentene | 2.80 |
| Ammonium hydroxide 28% | 1.37 |
| Water | 62.80 |
| | 100.00 |

A short cut textile printing foam was prepared by mixing 9.35 parts of this Benzidine Yellow pigment concentrate with 44.6 parts of the foam base of Example I, and beating with a high speed mixer until the resulting foam had a density of 0.54.

Example X

A long cut textile printing foam was made by mixing 2.12 parts of the Benzidine Yellow pigment concentrate of Example IX with 50.9 parts of the foam base of Example I, and beating the mixture with a high speed mixer until the resulting foam had a density of 0.53.

Example XI

For this and Example XII, a brown pigment blend concentrate was employed. This concentrate had the following composition:

| | Percent |
|---|---|
| ITR Red pigment | 4.97 |
| Benzidine Yellow pigment | 5.69 |
| Carbon Black pigment | 2.80 |
| Duponol ME | 3.58 |
| Methocel 15 cps | 0.98 |
| Ammonium oleate | 1.62 |
| Carbopol K-934 | 0.36 |
| Ammonium polyacrylate | 0.51 |
| Melamine-formaldehyde resin | 5.44 |
| Ethylene glycol | 2.17 |
| Glycerine | 2.67 |
| Turpentine | 3.66 |
| Dipentene | 3.07 |
| Ammonium hydroxide 28% | 1.49 |
| Tamol N (neutral sodium salt of condensed aryl sulfonic acid, made by condensing formaldehyde with naphthalene sulfonic acid) | 0.39 |
| Water | 60.60 |
| | 100.00 |

(The ITR Red pigment used in the example is the pigment specified in RB-60 in the Resin Bonded Pigment Index contained in the 1956 A.A.T.C.C. yearbook.)

A short cut textile printing foam was made by mixing 9.7 parts of the above brown blend pigment concentrate with 46.4 parts of the foam base of Example I and beating the mixture with a high-speed stirrer until the resulting foam had a density of 0.56.

Example XII

A long cut brown textile printing foam was made by mixing 2.12 parts of the brown blend pigment concentrate of Example XI with 50.9 parts of the foam base of Example I and beating the mixture with a high-speed stirrer until the resulting foam had a density of 0.53.

Example XIII

A blue textile printing foam was prepared by mixing the Phthalocyanine Blue pigment concentrate of Example V with an equal weight of the foam base of Example I and beating in air with a high speed stirrer until the resulting foam had a density of 0.67.

Dye printing foams may be prepared similarly to pigment printing foams, though the binder resins and anti-crock agents customarily employed in pigment printing need not be used, of course, in dye printing.

Example XIV

A red dye textile printing foam was prepared by mixing 16 parts of a stabilized azoic dyestuff (e.g., the stabilized diazo salt of 2-methoxy-5-chloro aniline and Naphthol AS-OL) dispersion, with 30 parts of the foam base of Example II. The mixture was then beaten with a high-speed stirrer until the density of the resulting foam was 0.46.

Example XV

A brown dye textile printing foam was prepared by adding 0.91 part of Direct Brown R (C.I. #420, a member of the Diamine Brown M class) to 47 parts of the foam base of Example III and beating with a high-speed mixer until the foam density was 0.48.

Example XVI

A vat dye printing foam was prepared by mixing Belanthrene Jade Green Supra Double paste (Color Index #1101, a member of the Caledon Jade Green class), 2.9 parts, Duponol ME, 0.61 part, Vat Gum, 43.7 parts, water, 6.67 parts and then beating the mixture with a high-speed stirrer until the foam had a density of 0.54.

Although, as above pointed out, we prefer to incorporate binder resins and elastomer latices into our foams to improve crock-resistance and washability of the printed goods, and also prefer to employ a foam stabilizer to improve the storage and handling stability of the printing foam, we have made excellent prints from foams not containing such additives. For example, beautiful and strong yellow prints have been made from a foam containing approximately 7.14% Benzidine Yellow pigment, 2.50% sodium lauryl sulfate (Duponol ME), 36.06% water, and 54.30% air. Crock-resistance and wash-fastness of these prints were improved by applying an overlayer of anti-crock elastomer latex by padding, spraying, or printing means.

The foregoing examples illustrate some of the foams with which we have done successful printing on textile goods. The foams of Examples V, VI, VII, VIII, IX, X, XI, and XII were compared as printing media with conventional-type oil-in-water printing pastes made up from the same color concentrates and prepared so that the oil-in-water systems had the same pigment and latex contents per volume of printing medium as had the corresponding foams. Printing was done on 80 x 80 cotton on a gravure print machine and using the ink-distributor described above and illustrated by the drawing. By weighing the ink reservoir (indicated as 1 in Figure 1) before and after each run it was possible to determine the amount of each ink deposited on the cloth; dividing this amount by the number of yards printed gives a "mileage" figure of grams ink per linear yard of cloth. From the known pigment content of each ink the "grams of pigment per yard printed," shown in the following table, was obtained.

| Color and Grams of Pigment per Yard | | | Color of Foam Print v. Color of Oil-In-Water Print |
|---|---|---|---|
| Example No. | Foam | Oil-In-Water | |
| Blue: | | | |
| Example V | 0.064 | 0.063 | very much stronger. |
| Example VI | 0.0136 | 0.0147 | Do. |
| Violet: | | | |
| Example VII | 0.037 | 0.040 | much stronger. |
| Example VIII | 0.0096 | 0.012 | very much stronger. |
| Yellow: | | | |
| Example IX | 0.059 | 0.059 | much stronger. |
| Example X | 0.015 | 0.013 | stronger. |
| Brown: | | | |
| Example XI | 0.055 | 0.059 | Do. |
| Example XII | 0.015 | 0.015 | much stronger. |

From this table it can be seen that in these comparison tests it was possible to deposit, in each case, almost exactly the same amounts of pigment from the foam and from the oil-in-water systems. In only two out of eight cases was more pigment deposited from the foam than from the oil-in-water system. Yet in every case, the foam print was definitely stronger than the oil-in-water print. This definitely shows the superior efficiency of the foam printing system. A further advantage of the foam prints over the corresponding standard oil-in-water emulsion prints, shown by this series of comparison tests, was found to lie in the almost complete absence of "tarnishing" in the print which resulted from the foam printing. "Tarnishing," in the textile printing art, refers to the unwanted and unintended deposition of color in the unprinted areas of the design, and is caused by incomplete removal of ink from the unengraved areas of the printing cylinder. Apparently the foamed ink tends to be more completely removed from these unengraved portions of the printing cylinder than is the oil-in-water emulsion ink.

A similar comparison was made between the foam prints from the foams of Examples V and VI and conventional water-in-oil printing emulsions containing the same amounts of pigment and latex. In these cases also the foam systems gave definitely stronger prints, for the same deposition of pigment, than did the water-in-oil systems, though the difference here was not so great as between the foam and oil-in-water systems.

Foam prints and corresponding oil-in-water and water-in-oil prints prepared as above were compared for crockfastness, washfastness and dry-cleaning fastness. In nearly all cases the foam prints were superior in these regards which is all the more surprising because of their having initially much stronger colors.

The brown dye printing foam of Example XV was compared with a standard gum printing formulation containing the same dye in the same concentration by printing with a gravure print machine on 80 x 80 cotton and drying on the steam can. Both prints were steamed for 15 minutes, washed first with salt water, then with detergent, rinsed, and dried. The color value of the foam print was slightly better than that of the standard. This was confirmed by an actual "mileage" determination in which 0.0435 gram of dyestuff per linear yard was deposited from foam and 0.0455 gram of dyestuff from the standard. Although the foam print thus received about 4% less dye than the standard, it had the stronger color of the two.

The vat green printing foam of Example XVI was compared with a standard vat green gum printing paste of the same concentration by printing both formulations on 80 x 80 cotton with a gravure print machine. Specimens of the printing were then dried, steamed at 212° F. for ½ hour, rinsed in a 2% sodium dichromate-2% acetic acid mixture, rinsed in water, and again dried. The foam print had a much stronger color than the standard.

Our system of foam printing was further compared with the conventional oil-in-water system by printing with the red pigment of Example XI at two different concentrations (1:10 and 1:104 cuts) under similar conditions on test strips containing twenty different fabrics. The color intensity was generally greater in the samples printed from foam than in samples printed from oil-in-water print pastes of the same pigment concentration. Good prints were obtained on acetate, Acrilan, Aralac, Arnel, cotton, Cupioni, spun and filament Dacrons, Dynel, Fortisan, Mohair, spun nylon, spun and filament Orlon, silk, unwoven fabric, viscose, and wool, using the foamed inks, but in these particular tests, the print quality on fiber glass and nylon filament was poor.

A series of foamed inks was made based on a commercial blue pigment dispersion which contained a non-ionic dispersing agent. Examples of these foamed inks are as follows:

*Example XVII*

A commercial blue pigment dispersion consisted of:

| | Parts |
|---|---|
| Copper phthalocyanine blue | 16.15 |
| Water | 64.65 |
| Sodium pentachlorophenate | 0.50 |
| Diethylene glycol monomethyl ether | 3.00 |
| Ethylene diamine | 0.30 |
| 25% aqueous solution of Emulphor ON (a water-soluble polyoxyethylene ether of oleyl alcohol) | 15.40 |

It was converted to an ink base having the following composition:

| | Parts |
|---|---|
| Blue pigment dispersion | 10.0 |
| Goodrite Carbopol K–934 (5%) | 5.0 |
| Water | 20.0 |
| $NH_4OH$ (28%) | 0.255 |
| Latex (40% solids of 60% butadiene and 40% acrylonitrile with non-ionic emulsifier) | 5.0 |
| Keltex (2% sodium alginate) | 5.0 |
| | 45.225 |

*Example XVIII*

To 45.25 parts of the Blue Ink base of Example XVII was added 5 parts of water and 0.25 part of diamyl sodium sulfosuccinate (Aerosol AY). The mixture was beaten with a high-speed mixer until it had a density of 0.50, and was then printed on 80 x 80 cotton with a small gravure print machine. Satisfactory prints were obtained.

*Example XIX*

To 45.25 parts of the Blue Ink base of Example XVII was added 1.5 parts of Ahcowet ANS (a commercial sodium alkyl aryl sulfonate containing 55% solids). The mixture was beaten with a high-speed mixer until it had a density of 0.52, and was printed as in Example XVIII. Satisfactory prints were obtained.

*Example XX*

To 45.25 parts of the blue ink base of Example XVII was added 2.0 parts of Alipal CO–433 (sodium salt of a sulfated water-dispersible ethylene oxide-alkyl phenol condensate) containing 28% solids. The mixture was beaten with a high-speed mixer until it had a density of 0.50, and was then used for printing as in Example XVIII. Satisfactory prints were obtained.

*Example XXI*

To 45.25 parts of the Blue Ink base of Example XVII was added 0.75 part of Alrosol C (a non-ionic fatty amide wetting agent and detergent), and the resulting mixture was beaten with a high-speed mixer until it had a density of 0.51. Prints made as in Example XVIII were satisfactory.

Example XXII

To 45.25 parts of the Blue Ink base of Example XVII was added 1.0 part of Miranol CM (an amphoteric wetting and emulsifying agent marketed by the Miranol Chemical Company and reported to have the structure

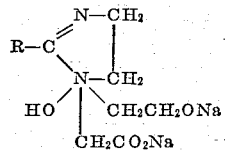

wherein R is representative of the alkyl radicals corresponding to the fatty alcohols derived by catalytic hydrogenation of cocoanut oil). The mixture was beaten with a high-speed mixer until it had a density of 0.48. Prints made as in Example XVIII were satisfactory.

Example XXIII

To 45.25 parts of the Blue Ink base of Example XVII was added 0.5 part of Sarkosyl NL-30 (sodium N-lauroyl sarcosinate), and the resulting mixture was beaten with a highspeed mixer until it had a density of 0.42. Prints made as in Example XVIII were satisfactory.

Example XXIV

To 45.25 parts of the Blue Ink base of Example XVII was added 1.4 part of Ultrapol S (a detergent and emulsifier consisting of a fatty acid-amine condensate and marketed by the Ultra Chemical Works). The mixture was beaten with a high-speed mixer until a density of 0.56 was reached. Prints made as in Example XVIII were satisfactory.

Example XXV

A blue ink base having the following composition was prepared from the blue color concentrate used in Example XVII:

| | Parts |
|---|---|
| Carboxymethylhydroxyethyl cellulose (CMHEC-37) (67%) | 20 |
| Synthetic rubber latex containing non-ionic emulsifier | 5 |
| Water | 15 |
| Blue Color Concentrate used in Ex. XVII | 10 |

To 50 parts of this blue ink base was added 4 parts of Ammonyx AO (20% solids) an alkyl dimethylamine oxide marketed by the Onyx Oil and Chemical Co. This mixture was then beaten with a high-speed stirrer until it had a density of 0.49.

Example XXVI

To 50 parts of the blue ink base of Example XXV was added 4 parts of Miranol QCK (a cationic surfactant marketed by the Miranol Chemical Company and reported to be a modified lauroyl imidazolene hydroxy carbonate). This mixture was beaten with a high-speed stirrer until a density of 0.54 was reached.

Prints made with the foamed inks of Examples XXV and XXVI were satisfactory, but the color value was somewhat weaker than with the anionic and non-ionic systems.

What is claimed is:

1. A process of printing on textiles which includes applying a foamed print paste having a density between 0.1 and 0.9 to the engravings of an intaglio printing cylinder, said print paste being maintained in an enclosed feeding device which excludes air from contact with the print paste in the vicinity of its contact with the engraved cylinder, and then contacting the printing cylinder engravings with the textile to be printed to transfer the print paste from the engravings to the textile.

2. A process of printing on textiles which includes applying a foamed pigmented print paste having a density of 0.1 to 0.9 to the engravings of an intaglio printing cylinder, the said print paste being maintained in an enclosed feeding device which excludes air from contact with the print paste in the vicinity of its contact with the engraved cylinder, and transferring the print paste from the engravings of the cylinder to the textile to be printed.

3. A process of printing on textiles which includes applying a foamed print paste having a density of 0.3 to 0.75 to the engravings of an intaglio printing cylinder by means of an enclosed feeding device which excludes air from contact with the print paste in the vicinity of its contact with the engraved cylinder, and transferring the print paste from the engravings of the cylinder to the textile to be printed.

References Cited in the file of this patent

UNITED STATES PATENTS

| | | |
|---|---|---|
| 1,234,732 | Clavel | July 31, 1917 |
| 1,316,808 | Schmid | Sept. 23, 1919 |
| 1,829,905 | Lilienfeld | Nov. 3, 1931 |
| 1,948,568 | Faber et al. | Feb. 27, 1934 |
| 1,964,098 | Wainwright et al. | June 26, 1934 |
| 2,324,605 | Urquhart | July 20, 1943 |
| 2,377,110 | Smith | May 29, 1945 |
| 2,434,013 | Ross | Jan. 6, 1948 |